E. S. COPELAND.
LAND MARKER.
APPLICATION FILED MAY 17, 1911.
1,104,630.
Patented July 21, 1914.
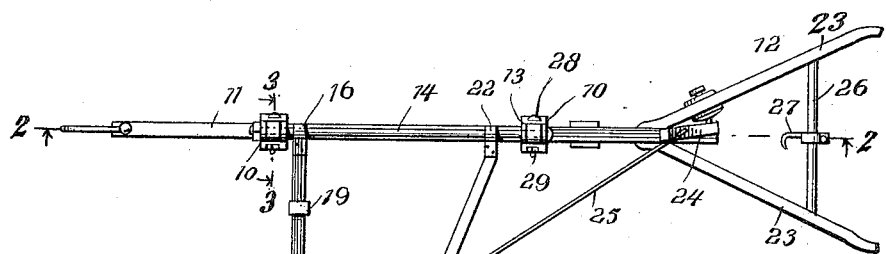
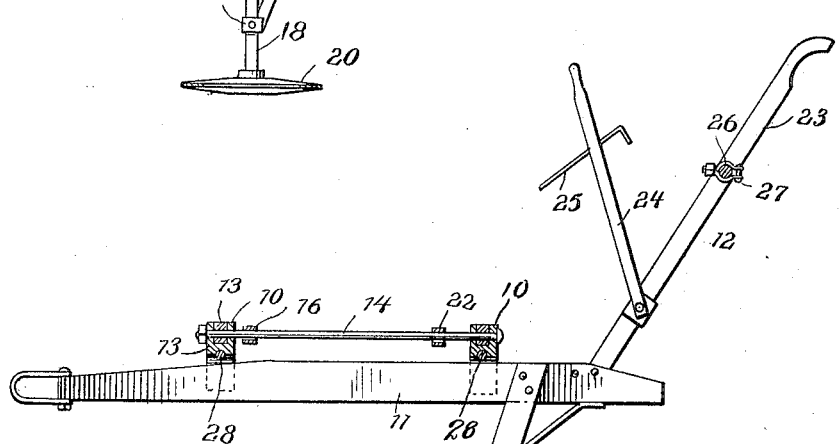
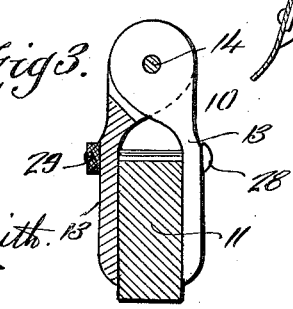
Inventor
Elisha S. Copeland.
Witnesses
William R. Smith
F. A. Hoster
By Victor J. Evans
Attorney

UNITED STATES PATENT OFFICE.

ELISHA S. COPELAND, OF BETHUNE, SOUTH CAROLINA.

LAND-MARKER.

1,104,630.  Specification of Letters Patent. Patented July 21, 1914.

Application filed May 17, 1911. Serial No. 627,694.

*To all whom it may concern:*

Be it known that I, ELISHA S. COPELAND, a citizen of the United States, residing at Bethune, in the county of Kershaw and State of South Carolina, have invented new and useful Improvements in Land-Markers, of which the following is a specification.

The invention relates to agricultural implements, more particularly to plows, and has for an object to provide an attachment for gaging and marking the line to be followed by the plow in making a furrow in the ground.

For the purpose mentioned, use is made of a plurality of clamps for attachment to the beam of a plow, a rod connecting the said clamps, a supporting bar pivotally connected with the said rod, a wheel bar adjustably mounted on the said supporting bar, a wheel mounted at the outer end of the said bar, a lifting bar connected to the said supporting bar and a lever mounted on the said plow beam and connected with the said lifting bar for raising the said supporting bar and said wheel bar to move the same from one side of the plow to the other, means being provided on the plow for retaining the said lever in rigid position.

In the further disclosure of the invention reference is to be had to the accompanying drawings, constituting a part of this specification, in which similar characters of reference denote corresponding parts in all the views, and in which:

Figure 1 is a plan view; Fig. 2 is a fragmentary vertical sectional view taken on the line 2—2 in Fig. 1, looking in the direction of the arrow; and Fig. 3 is an enlarged vertical transverse sectional view taken on the line 3—3 in Fig. 1, looking in the direction of the arrow.

Referring more particularly to the views, I provide a plurality of clamps 10 for attachment to the beam 11 of a plow 12. The clamps 10 each consist of a plurality of fingers 13 hingedly connected, a rod 14 being provided to act as the pivotal member for the fingers 13 of each of the clamps and the said rod having one of the clamps 10 at each end thereof. Mounted to swing on the rod 14, between the clamps 10, is a supporting bar 15 having a looped bearing 16 secured to the inner end thereof, the said looped bearing engaging the rod 14 so that the supporting bar can be swung relatively to the rod. Secured to the outer end of the supporting bar 15 is a bearing 17 in which is slidably mounted a wheel bar 18, the said wheel bar having secured thereto at the inner end a bearing 19 slidable on the supporting bar 15 and having revolubly mounted at the outer end thereof a wheel 20. A lifting bar 21 has the outer end thereof secured to the supporting bar 15 and the inner end provided with a looped bearing 22 similar to the bearing 16 and connected to the rod 14 so that the lifting bar 21 can be swung relatively to the rod.

Pivotally mounted between plow handles 23 secured to the beam 11, is a lever 24 having a rod 25 connected thereto and hingedly connected to the lifting bar 21. A cross bar 26 is secured to the handles 23 and mounted on the cross bar is a locking lug 27 adapted to receive therein the lever 24 to releasably retain the same in rigid position. The fingers 13 of the clamps 10 are provided with relatively registering apertures through which are extended bolts 28 having thumb screws 29 threadedly connected thereto.

To attach my device to a plow beam 11, the thumb nuts 29 are operated to open the clamps so that the fingers 13 can be engaged with the plow beam 11, after which the thumb nuts 29 are again operated to rigidly secure the fingers in engagement with the plow beam 11. Thus it will be seen that the supporting bar 15 together with the wheel bar 18 having the wheel 20 thereon and the lifting bar 21 will be positioned on one side of the plow beam 11 and when draft animals are secured to the plow beam in the usual manner and the same is operated over the ground, the wheel 20 will make a line along the ground, the said line being adapted to denote the line of furrow to be made by the plow on the return trip over the ground, and thus it will be seen that each time that the plow operates over the ground to make a furrow the wheel 20 will make a line adjacent the furrow being made by the plow, the said line denoting the position of the next prospective furrow. In this way the furrows made with the plow will be equally spaced apart and the entire field or ground to be plowed will be furrowed in a regular and even manner. By pulling on the lever 24 the operator can swing the wheel 20 to either side of the plow beam 11.

When it is desired to retain my gaging device in inoperative position, the lever 24 is pulled rearwardly and engaged with the locking lug 27, thus vertically positioning the gaging device, so that the same will not be in contact with the ground.

Having thus described my invention, I claim:

In a land marker, the combination with an agricultural implement, of a plurality of clamps connected with the beam of said implement, a pivoted rod mounted between the said clamps and connecting the same, the said clamps being adapted to constitute the pivot members of the said rod, a supporting bar mounted to swing on the said rod, an adjustable wheel bar mounted to slide on the said supporting bar, a wheel on the said wheel bar, means for adjusting the wheel bar relatively to the supporting bar, a lifting bar mounted to swing on the said rod and secured to the said supporting bar, a rod having pivotal connection with the said lifting bar, a lever pivoted on the said implement and connected to the said lifting bar for swinging the same from one side of the implement to the other, and a locking lug on the cross bar of the said implement and adapted to receive and secure the said lever in locked position thereon.

In testimony whereof I affix my signature in presence of two witnesses.

ELISHA S. COPELAND.

Witnesses:
J. E. COPELAND,
D. M. BETHUNE.

Copies of this patent may be obtained for five cents each, by addressing the "Commissioner of Patents, Washington, D. C."